United States Patent [19]
Nothum, Sr. et al.

[11] Patent Number: 5,937,744
[45] Date of Patent: Aug. 17, 1999

[54] CONVERTIBLE DRUM-TYPE COATING APPARATUS

[76] Inventors: Robert G. Nothum, Sr., 2719 S. Catalina, Springfield; Robert G. Nothum, Jr., 6356 W. State Hwy O, Willard, both of Mo. 65781

[21] Appl. No.: 09/166,315

[22] Filed: Oct. 5, 1998

Related U.S. Application Data

[60] Provisional application No. 60/068,000, Dec. 9, 1997.

[51] Int. Cl.$^6$ .............................. A23L 1/22; A23G 3/00; A47J 44/00; B05C 19/00
[52] U.S. Cl. ................................ 99/494; 99/352; 99/407; 99/516; 118/13; 118/18
[58] Field of Search ............................. 99/485, 494, 516, 99/352–355, 403, 407, 450.1, 450.2; 118/13, 16–18, 19, 20, 22, 24, 239, 257, 261, 423, 429, 308, 312, 621, 626; 198/715, 384, 659, 580, 613; 426/289, 292, 293, 295, 296, 94, 96, 99, 305, 519, 560, 443, 446

[56] References Cited

U.S. PATENT DOCUMENTS

| | | | |
|---|---|---|---|
| 3,735,726 | 5/1973 | Butler | 118/24 |
| 3,739,743 | 6/1973 | McKee, Jr. | 99/494 X |
| 4,497,244 | 2/1985 | Koppens | 99/450.1 X |
| 5,020,427 | 6/1991 | Kennefick et al. | 99/516 X |
| 5,052,330 | 10/1991 | Stacy | 118/312 X |
| 5,226,354 | 7/1993 | Stewart | 99/494 |
| 5,236,502 | 8/1993 | Wadell | 118/13 X |
| 5,238,493 | 8/1993 | Miller | 99/494 X |
| 5,284,514 | 2/1994 | Griffiths | 99/494 X |
| 5,514,399 | 5/1996 | Cordera et al. | 426/295 |
| 5,643,361 | 7/1997 | Wadell | 494/18 X |
| 5,664,489 | 9/1997 | Herrick, IV | 99/494 |
| 5,707,448 | 1/1998 | Cordera et al. | 99/494 X |

OTHER PUBLICATIONS

The Stein™ "Rotary Drum Pre–Dust Applicator," an informational data sheet on the product from Stein Food Processing Systems, Frigoscandia, A.G.A, date unknown.

Primary Examiner—Timothy F. Simone
Attorney, Agent, or Firm—Jonathan A. Bay

[57] ABSTRACT

A convertible drum-type coating apparatus for applying breading material to food products includes an in-line breader section, a rotary drum section, and an outflow section. The rotary drum is mounted on an elevator for lowering and lifting between a low use position and a high non-use position. The low use position is involved with tumbling the breading material and food product together to enhance the coating by the breading material, and in a sense the tumbling gives the appearance of dusting off excess breading material. The coating apparatus is convertible in that the rotary drum can be lifted out of the way to the high non-use position to allow substitution in favor of a bypass conveyor. Bypass of the drum is desired when running "formed" food products and the like, such as patties (eg., beef) or cakes (eg., fish), which are ordinarily too delicate to tumble in the drum. The convertible drum-type coating apparatus further includes an auger-less re-circulation system for recovering excess breading material from the outflow section and returning it for re-use to the in-line breader section. Eliminating augers or "screw-conveyors" avoids clogging problems associated therewith. The convertible drum-type coating apparatus moreover includes a spreader mechanism at the drum's discharge end for spreading the discharging product in a series of courses traversing the lateral width of the outflow conveyor. This improvement eliminates four and five worker crews who to date do the same thing manually.

20 Claims, 7 Drawing Sheets

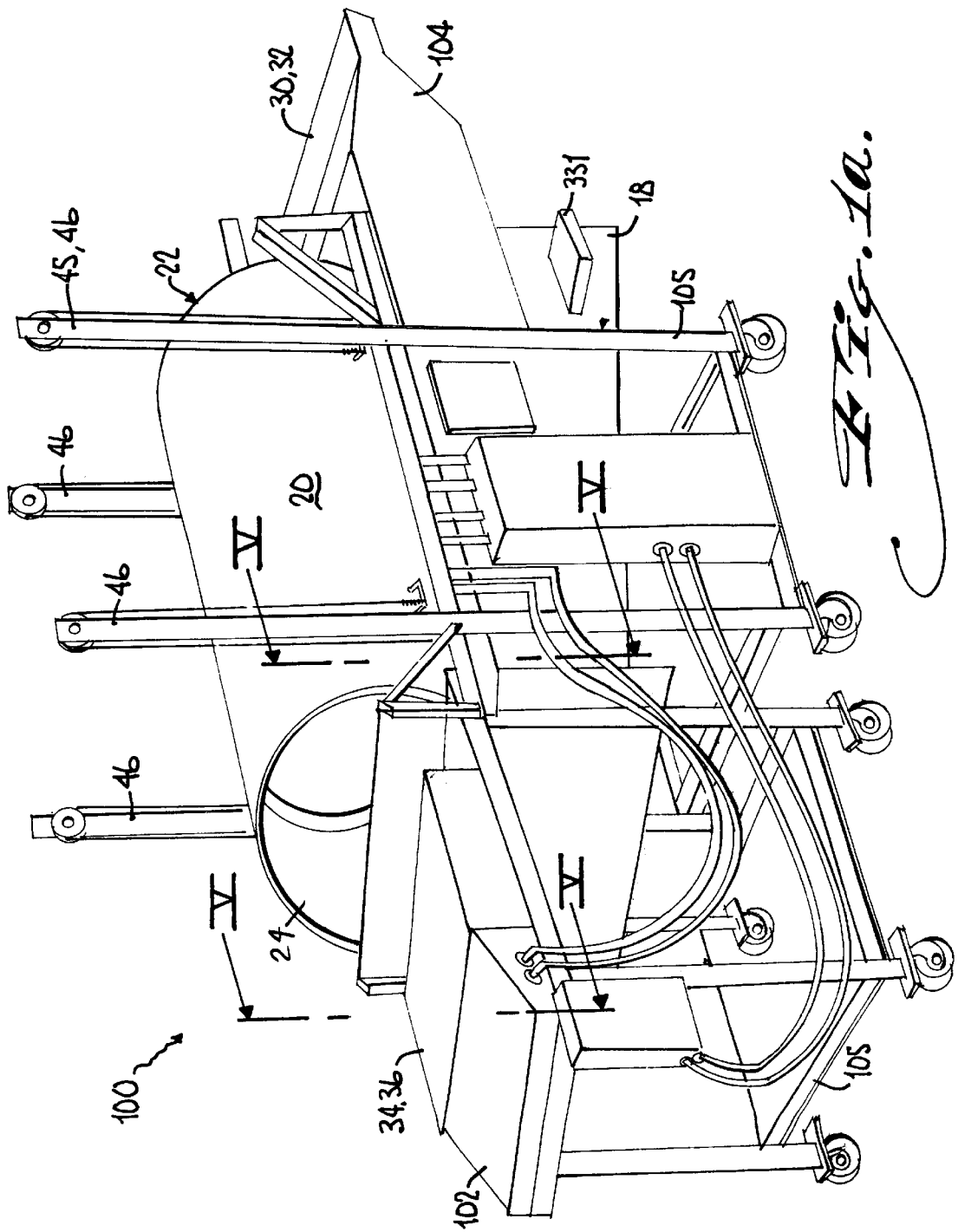

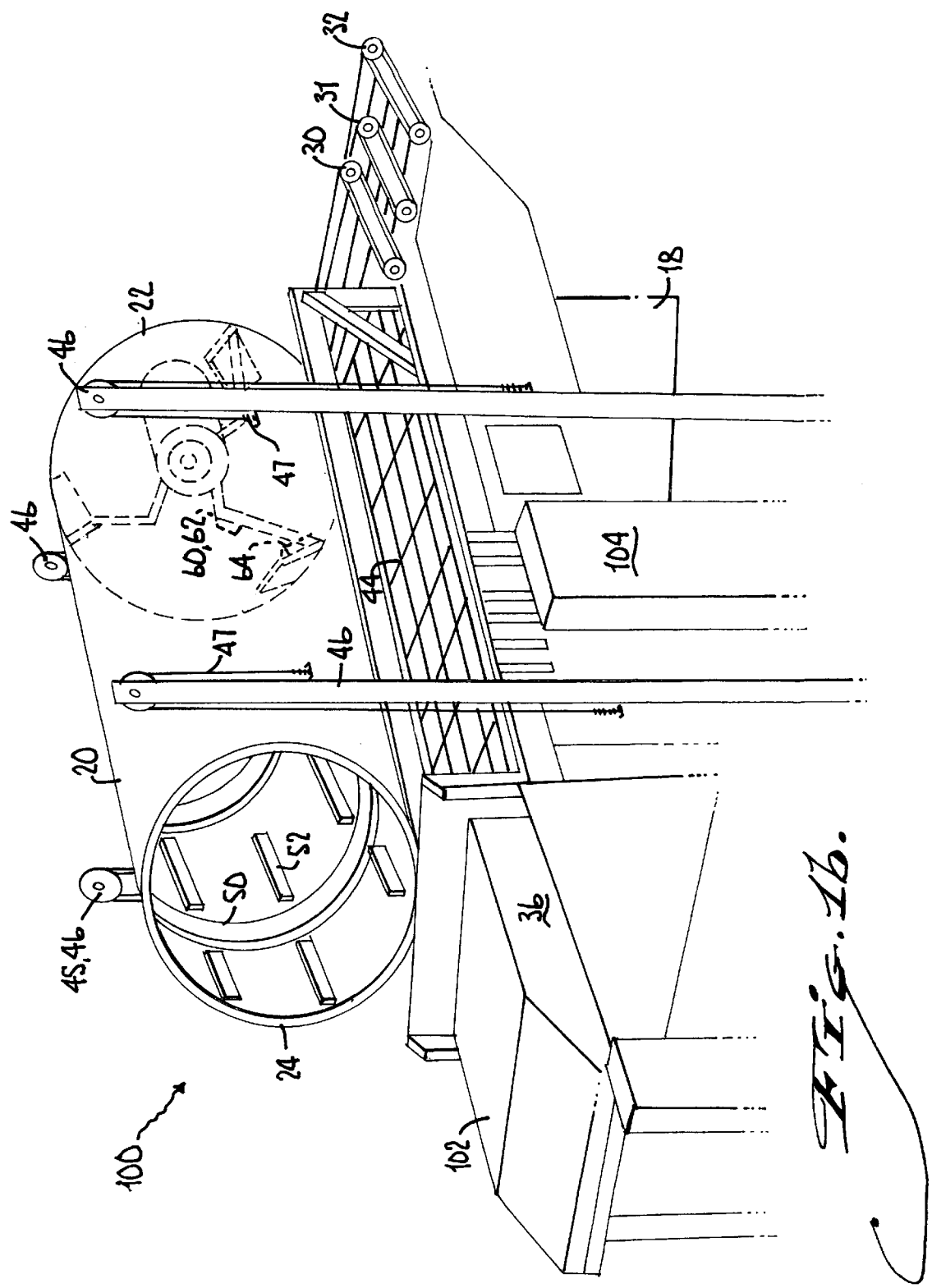

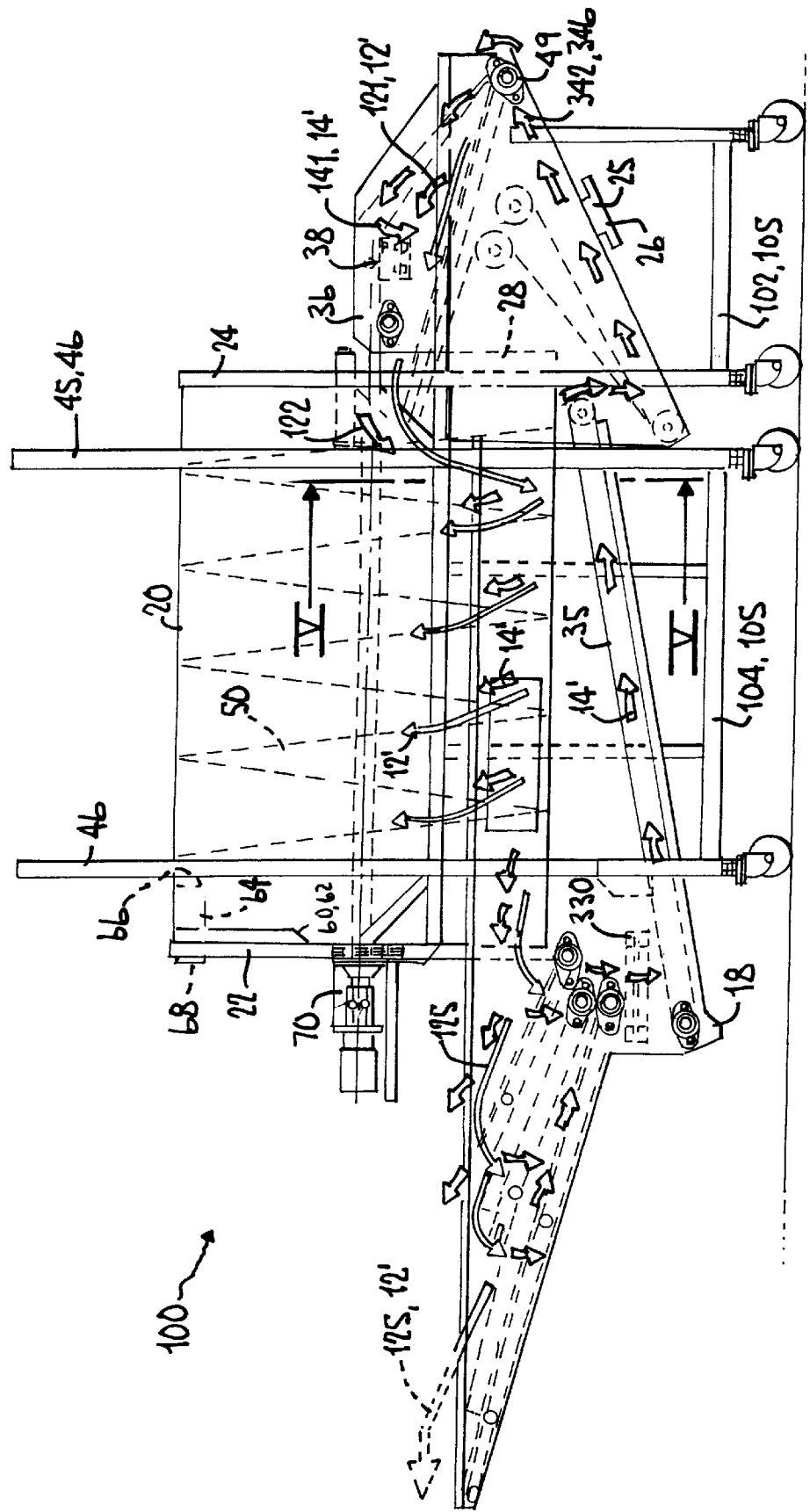

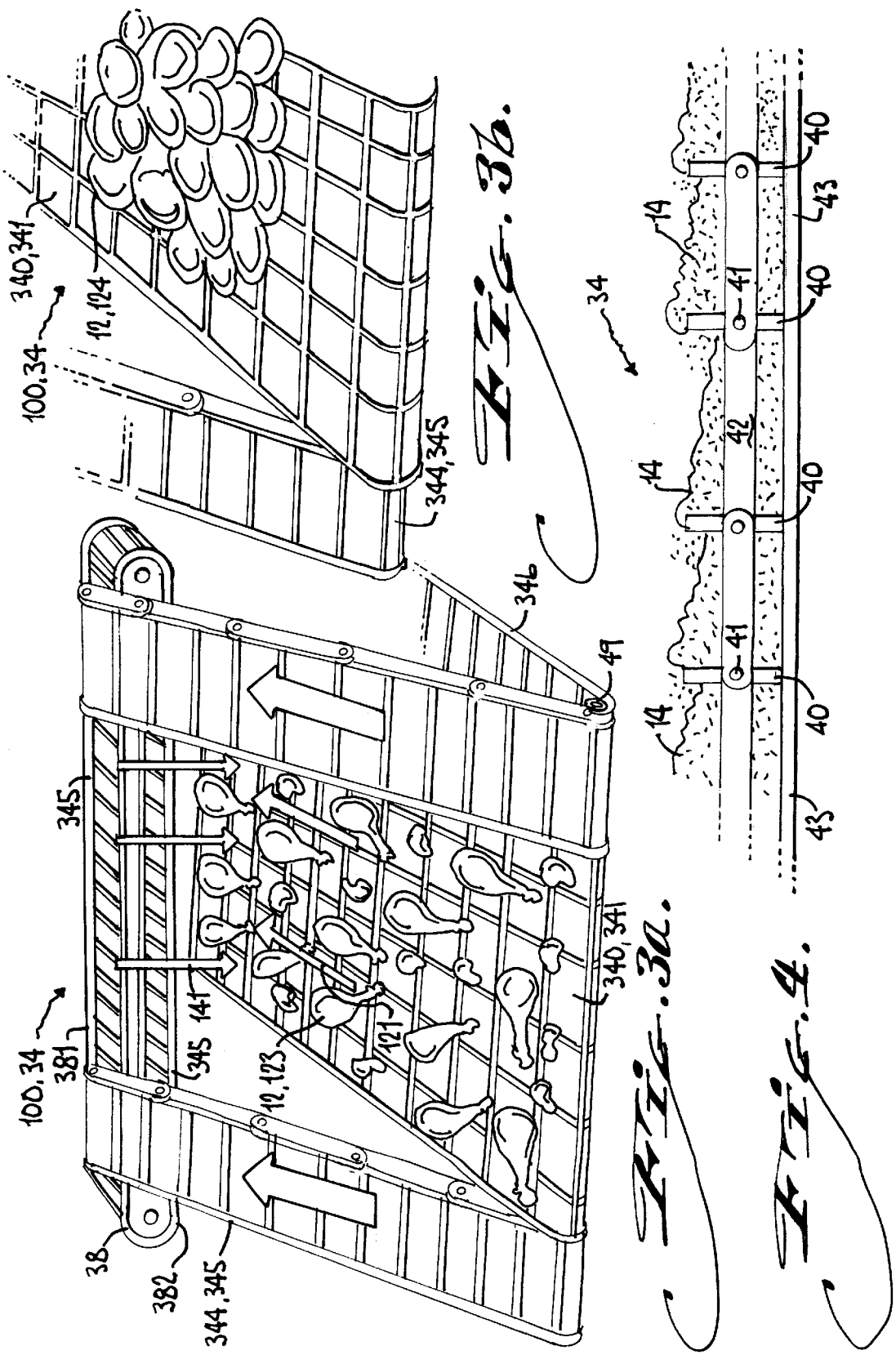

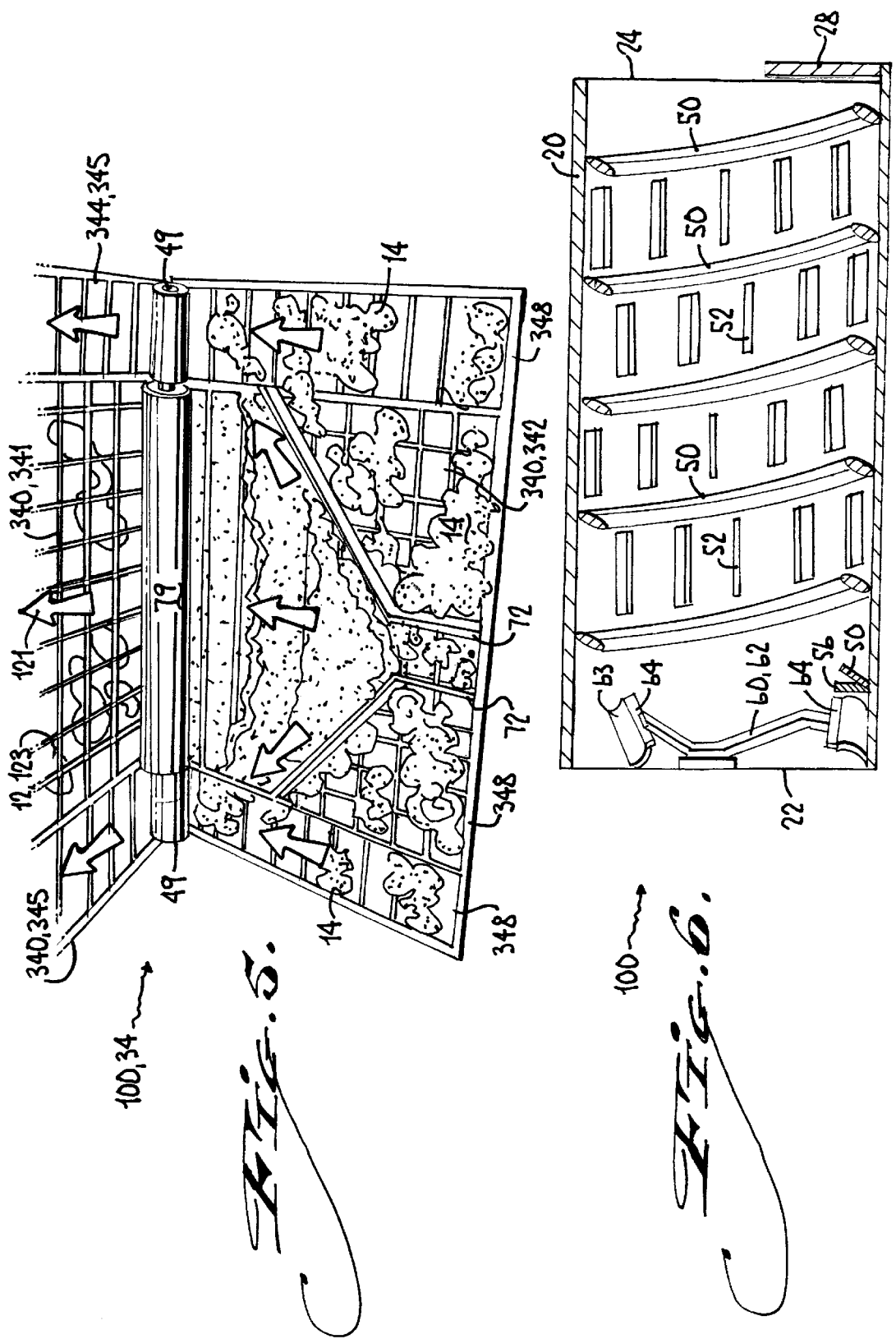

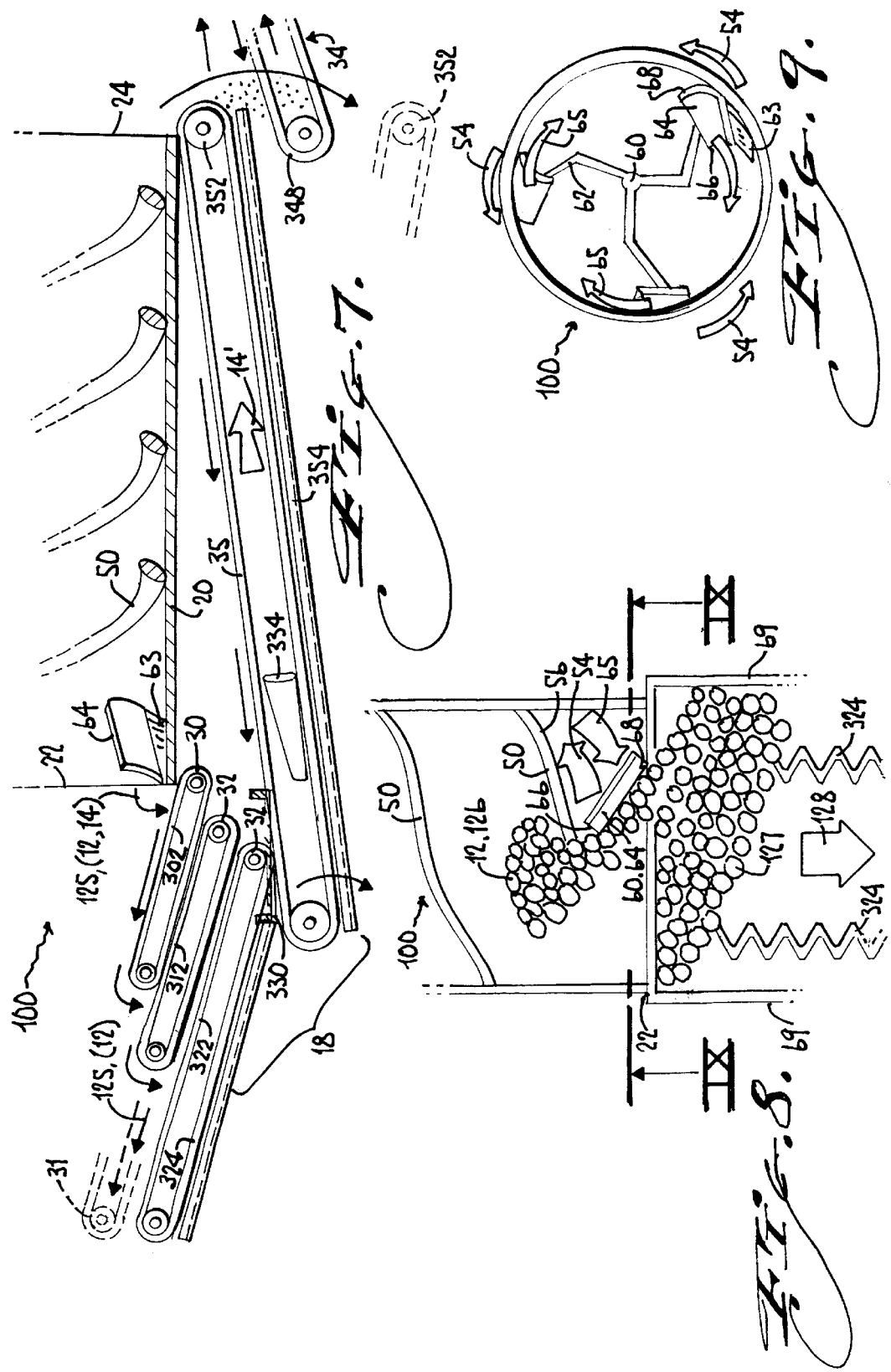

CONVERTIBLE DRUM-TYPE COATING APPARATUS

CROSS-REFERENCE TO PROVISIONAL APPLICATION(S)

This application claims the benefit of U.S. Provisional Application No. 60/068,000, filed Dec. 9, 1997.

BACKGROUND AND SUMMARY OF THE INVENTION

The invention relates to a coating apparatus for applying a coating to a stream of product passing continuously through it, and more particularly to a coating apparatus that handles food products fit for human consumption including without limitation chicken, fish, seafood, pork, beef and so on. The coating material is commonly a breading material which might range in composition from a flour mixture to a coarse bread-crumb mixture. The various kinds of breading material allow inclusion of spices or flavorings within the mixture.

The coating apparatus has an infeed unit which is where the main coating activity takes place, and a drum which, when not bypassed, tumbles the coated product to knock off excess breading material as well as to ensure more even application of the coating material. The food product can be routed at the option of the operator(s) of the coating apparatus to bypass the drum. Bypassing the drum is desirable when processing "formed" food products such as beef patties or fish cakes and the like, which would disintegrate in the drum.

Further inventive aspects of this coating apparatus include improvements in the way that the drum discharges coated product onto an outflow conveyor. This is achieved by an inventive spreader. Conventionally, a drum pours its discharge onto an outflow conveyor (or the like) in a single track that occupies only a relatively narrow strip on the width of the outflow conveyor. This conventional single track is also piled such that it is generally undesirable. The prior art solution has been to station a crew of between about four to six workers at the discharge end of the drum, who manually spread out the clumped together product. It would be preferred if the outflowing product were automatically spread more evenly distributed across the whole width of the outflow conveyor. This would eliminate the need for the crew. The run-time of the food line would be more economical and would not as much be hostage to break- or meal-times of the crew, or shift-changes and the like. Hence the spreader in accordance with the invention provides a highly desirable result.

The coating apparatus also includes an inventive re-circulation system that allows such an economy measure as, the re-circulation of excess breading material. In use, much more breading material is applied by the infeed unit and tumbled in the drum than actually adheres to the product. Hence, the excess of this breading material is recovered from the discharge end of the drum, for return to and the infeed unit to mix with a fresh input stream of product to-be-coated. This re-circulation system is configured with features which comb out waste crumbs from the re-circulating breading material, distribute it proportionately between an overhead sprinkler and a main in-line infeed conveyor, with additional features of convenience for maintenance and cleaning. The prior art attempts at re-circulation systems have been characterized by screw conveyors (ie., a large screw-auger turning inside a tubular sleeve). The re-circulation system in accordance with the invention eliminates screw-conveyors and instead employs drag chain conveyors of the same type which typify the conveyor-of-choice for the rest of the invention. It is believed that screw conveyors are sufficiently susceptible to clogging or freezing when the breading material gets too wet that the elimination of screw conveyors is a substantial improvement. Unfreezing frozen screw-conveyors is a time-consuming chore, and is dreaded for good reason.

Additional aspects and objects of the invention will be apparent in connection with the discussion further below of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1a is a perspective view of a convertible drum-type coating apparatus in accordance with the invention (wherein the direction of flow of product through the apparatus is left to right such that the infeed-side is on the left in the view and the outflow-side is away to the right);

FIG. 1b is a perspective view comparable to FIG. 1a except that the drum is in its elevated, non-use position;

FIG. 2 is opposite side elevational view of FIG. 1a (wherein the direction of flow of product through the apparatus is right to left such that the infeed-side is on the right in the view and the outflow-side is away to the left), such that FIG. 2 also includes diagrammatic depiction of the flow paths through the coating apparatus of the product (in large arrows) and the breading material (in small arrows), respectively, wherein small arrows for the breading material depict the circuit that the breading material follows in service of a re-circulation system therefor;

FIG. 3a is an enlarged scale perspective view of the infeed conveyor run (which while nominally shown by the views of FIGS. 1a or 2, is actually hidden from view by shield guards, and is taken in the direction of arrows III—III in FIG. 2), wherein the infeed conveyor run is shown carrying an infeed of assorted chicken pieces to illustrate one operative use environment for the drum-type coating apparatus in accordance with the invention;

FIG. 3b is a perspective view comparable to FIG. 3a except showing the infeed of chicken pieces piled irregularly, rather than evenly distributed as shown by FIG. 3a, to illustrate the capability of the coating apparatus in accordance with the invention in handling an infeed of product in various irregular formats;

FIG. 4 is a side elevational view of a representative run of the infeed conveyor to illustrate its drag-chain configuration and how it manages to push (or motivate or advance) the breading material;

FIG. 5 is a perspective view of the vertex of the three astride infeed conveyors, and taken in the direction of arrows V—V in FIGS. 1a or 2;

FIG. 6 is a sectional view of the drum taken along a vertical plane of symmetry through the central axis thereof;

FIG. 7 is a partial sectional view, showing portions of the drum in section comparable to how it was shown in FIG. 6 (with other portions broken away), and also showing aspects of a re-circulation system, which comprises a series of conveyors for recovering excess breading material from the discharge end of the drum;

FIG. 8 is top plan view, partly in section and taken in the direction of arrows VIII—VIII in FIG. 7, showing operation of a deflector blade of a counter-rotating spreader impeller inside the drum at the discharge end thereof, for evenly distributing the discharge of the coated product across a full width of an outflow conveyor;

FIG. 9 is an elevational view taken in the direction of arrows IX—IX in FIG. 8; and, FIGS. 10a and 10b are pair of diagrammatic views for comparison between the prior art and the invention of how a food processing line is configured to step through three operations of (i) pre-dusting the food product with a flour mixture, (ii) coating the pre-dusted product with a batter mixture, and then (ii) coating the batter-covered product with a breading mixture, wherein:

DETAILED DESCRIPTION OF THE PREFERRED EMBODIMENTS

Figure 10A:
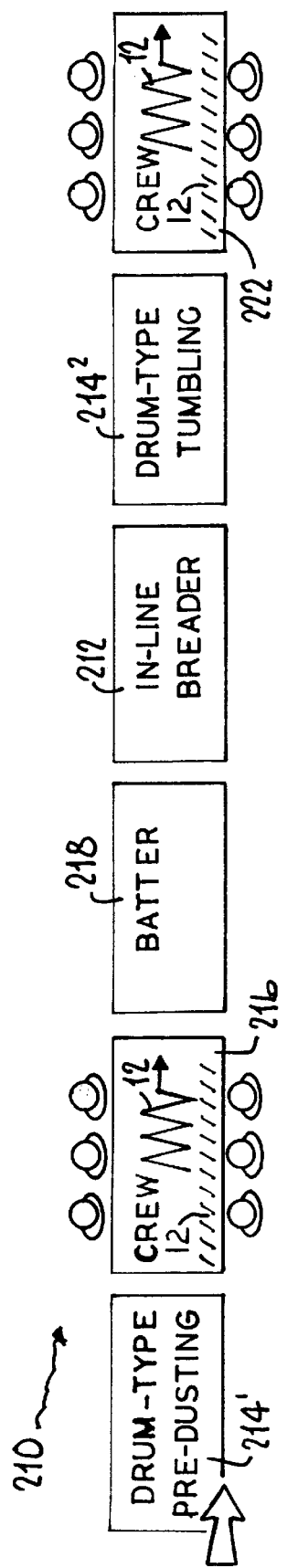
FIG. 10a shows a configuration representative of the prior art.

FIG. 1a shows a coating apparatus 100 in accordance with the invention. It has an infeed unit 102 and a drum unit 104, each of which is mounted on separate roller-footed stands 105 for convenient coupling (shown coupled) and de-coupling (not shown) of the infeed and drum units 102 and 104 together and apart for cleaning, service and maintenance purposes and the like.

One operative use environment for the coating apparatus 100 is within a process line 110 (see, eg., FIG. 10b) of the food industry. Installed in such a process line 110, the coating apparatus 100 provides coating to a food product 12. Example food products include without limitation chicken, fish, seafood, pork, beef. Chicken for instance, may appear as pieces, strips or nuggets and so on. A special case of food products is a "formed" product:—eg., beef patties or fish cakes. Formed products require more delicate handling as will be described more particularly below. The coating is conventionally although not exclusively a breading material ranging in composition from a relatively fine flour mixture to a relatively coarse bread-crumb mixture. When installed within the larger food process line 110 (eg., FIG. 10b), an infeed of food product is coated and discharged on a continual basis by the coating apparatus 100, to advance down-line to further processing stations.

Figure 10B:
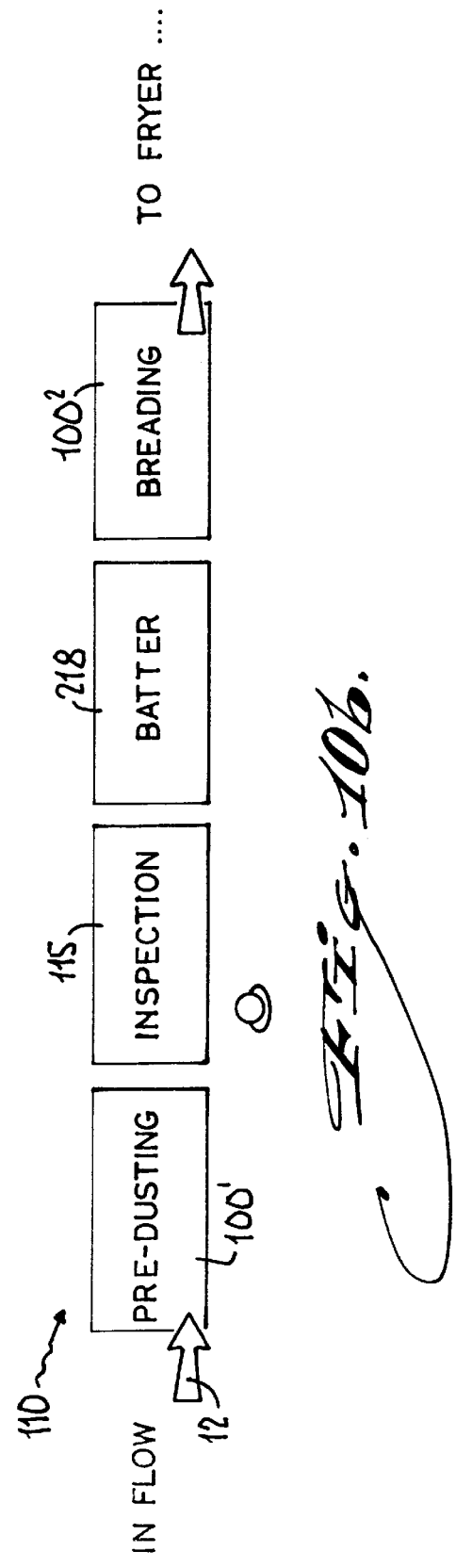
FIG. 10b shows a configuration in accordance with the invention.

With more particular reference to FIG. 10b, it shows the initial series of process stations $100^1$, 115, 218 and $100^2$ for production of a battered-covered product having a specialty outer covering of a bread-crumb layer. In this process line 110 there is a first coating apparatus $100^1$ in accordance with the invention situated at what is termed a "pre-dusting" station. A second coating apparatus $100^2$ is situated at what is termed a "breading" station. A "batter station" 218 occupies an in-between position. At the first coating apparatus $100^1$ in accordance with the invention (ie, the "pre-dusting" station), the food product 12 is pre-dusted with a flour and spice mixture as a base to allow better adhesion of a batter coating as well as to allow addition of spices and flavorings. The flour-dusted food product 12 advances down-line on to the "battering station" 218 where it gets a batter coating. Then the food product 12 enters the second coating apparatus $100^2$ in accordance (ie., the "breading" station) where it gets a bread-crumb mixture coating, for enhancing the texture and flavor of the product.

Although not shown in FIG. 10b, the food product 12 might thereafter advance to a "frying" station to set the coatings and add finishing touches to the product 12's appearance, and then a "freezing" station and "packaging" station and so on as is known in the art. Such a fried, frozen and packaged food product is marketed to consumer grocery stores, institutional cafeterias, retail restaurants including today's largest fast food chains, and like establishments in the food service industry.

Naturally enough, when the coating apparatus 100 is situated in the "pre-dusting station" it is loaded with a flour mixture as the breading material. Likewise, at the "beading station" the coating apparatus 100 is loaded with something like or including a bread-crumb mixture as the breading material.

Referring generally to FIGS. 1a/1b and 2, in general the coating apparatus 100 performs the following operations regardless of the actual breading material 14 it is handling, whether that be a flour mixture, bread-crumb mixture or whatever. The coating apparatus 100 receives an infeed 121 of product at the infeed unit 102. The product 12 is processed vis-a-vis by applying to the it desired coating 14 and then the product 12 is discharged by outflow conveyors 30–32 (not in view in FIG. 1a) for further down-line processing.

FIGS. 1a and 1b show that the coating apparatus 100 is convertible between alternate use formats. The FIG. 1a format entails using a drum 20 for tumbling off excess breading material. The FIG. 1b format bypasses the drum 20 by lifting it out of the way to a non-use position. The FIG. 1b format is specially desirable for handling delicate food products, which namely includes formed products such as patties (eg., beef) or cakes (eg., fish) and the like. The coating apparatus 100 provides means for shaking off excess breading material even without use of the drum 20. This is accomplished by the series of outflow conveyors 30–32. They are inclined one on top of another in a stack such that the transported food product 12 is dropped onto the first conveyor 30, to traverse and cascade over the end of the first conveyor 30 onto the second conveyor 31, and likewise to traverse and cascade over the end of second conveyor 31 onto the third conveyor 32. Each time the food product 12 lands on one of the outflow conveyors 30–32 it shakes off excess breading material 14. Also, the outflow conveyors 30–32 are vibrated to give a bumpy ride to the food product 12, which likewise helps in shaking off excess breading material 14. There is more description below concerning these matters with the outflow conveyors 30-32.

In use, the coating apparatus 100 is pre-charged with a load of breading material 14 (a hopper is included for this purpose, but is not shown). In other words, the breading material 14 does not flow into the coating apparatus 100 from up-line process stations as does the food product 12. The breading material 14 is already there. Typically the initial charge of breading material 14 is about fifty pounds (23 Kg). More is added on an as-needed basis to restock that amount of the breading material 14 which is continuously being carried away as a coating on the discharged product 12.

The infeed unit 102 is where the main coating activity takes place. To ensure that the food product 12 is sufficiently covered all over with the coating material, the infeed unit 102 slathers the food product in the breading material 14, most which is excess that preferably is tumbled and/or shaken off before the food product 12 is discharged down-line. Hence the coating apparatus 100 includes a re-circulation system 18 for recycling the excess breading material 14 recovered past the infeed unit 102.

In FIGS. 1a and 2, the re-circulation system 18 recovers excess breading material 14 from the discharge end 22 of the drum 20 as well as the vibrating cascades of the outflow conveyors 30–32. The re-circulation system 18 returns the recovered breading material 14 to the infeed unit 102 for subsequent coating applications. FIG. 2 diagrammatically depicts the flow paths through the coating apparatus 100 of the food product 12 (shown by large arrows 12') and the breading material 14 (shown by small arrows 14'), respectively. The small arrows 14' for the breading material 14 depict a loop or circuit that the breading material 14 follows in service of the re-circulation system 18. Of course, some fractional amount of the breading material 14 is lost from the re-circulation system 18 by doing what it should, ie., sticking to the food product 12 and continuously exiting the coating apparatus 100 with the food product 12 to down-line process stations (although this "loss" amount is not illustrated by means of the small arrows 12'). The "loss" amount progressively depletes the charge of breading material 14 in the re-circulation system 18 and from time to time must be replenished with the addition of more breading material.

The drum unit 104 supports the drum 20 for rotation about a horizontal longitudinal axis. In FIG. 1a, at the right end thereof (i.e., "right" in FIG. 1a), the drum 20 discharges the coated product 12 onto the series of outflow conveyors 30–32 (not in view, but see FIGS. 2 or 7). The turning drum 20 tumbles the food product 12 to knock off excess breading material 14 as well as (certainly in the case of "flour" breading material) also ensuring uniform application of the breading material 14.

FIG. 2 shows how to empty the coating apparatus 100 of breading material 14. The reasons for wanting to do this vary. Sometimes the breading material 14 is too wet and needs to be changed out for fresh dry breading material. Other times the coating apparatus 100 is being changed-over from handling one kind of breading material to another. Regardless of the reason, there are times it is desirable to empty out the breading material 14. The infeed unit 102 includes a transverse slot 25 which is closed off by a sliding pan 26. Retraction of the pan 26 while the coating apparatus 100 is running allows letting all the breading material 14 to empty out the slot 25.

FIG. 3a shows the appearance of the infeed conveyors 34 after removal of the shield guards 36 which as shown in FIGS. 1a and 2 are installed and kept on during use partly for containing airborne escape of the breading material 14. The infeed conveyors 34 comprise a central, relatively wide product-carrying conveyor 340 which is shown handling chicken pieces 123 for illustrative purposes only. This particular run of the central conveyor 340 will be referred to as the "infeed" run 341 thereof. The infeed conveyors 34 further comprise a pair of flanking conveyors 344 on the sides of the central conveyor 340 for lifting a fractional portion of the breading material 14 above the plane of the central conveyor 340, to be deposited on a transverse or sprinkling conveyor 38 that runs overhead of the path 121 of the product 123 below it. The sprinkling conveyor 38 is arranged to allow breading material 141 to sprinkle or sift down in a curtain on top of the food product 123. These particular runs of the flanking conveyors 344 will be referred to as the "upper elevator" runs 345 thereof.

With reference to FIG. 4, the conveyors used in the coating apparatus 100—including without limitation the series of infeed conveyors 34 and/or outflow conveyors 30 through 32—are a variety of flight-conveyors more specifically known as drag chain conveyors. Drag chain conveyors are conventional for moving granular material on generally horizontal paths or up inclines seldom greater than 45°. As FIG. 4 shows, a drag chain conveyor 34 has an open-link chain construction with divider panels 40 extending between the pivot pins 41 of two like link-chains 42 (only a near side chain 42 in view). The divider-panels 40 scrape across a pan 43 in a trough such that a given adjacent panels 40 define an open-box like cell which is suitable for carrying a load of breading material 14 therein. Any run of a conveyor which scrapes across such a supporting pan 43 is suitable for carrying the breading material 14 and hence is termed a "carrying run." In contradistinction, the absence of such a supporting pan 43 means that the breading material 14 is free to fall through and therefore will not be carried (although the run may nevertheless being a "carrying" run by virtue of transporting the product 12, which does not fall through between the panels 40).

FIG. 4 shows that for each cell between two panels 40—40, the trailing divider panel 40 pushes (or motivates or advances) the breading material 14 along in the direction of advance (ie., indicated by arrow 121). FIG. 4 more particularly shows how full the cells should be for the central infeed conveyor 340's carrying run 341 (see, eg., FIGS. 3a or 3b). Each cell is so full that some of the breading material 14 spills over the trailing panel 40 into the cell immediately following. From the vantage point of a chicken piece 123 as shown in FIG. 3a, it rests on top of the breading material 14 as the chicken piece 123 is transported along the carrying run 341 of the central infeed conveyor 340. That way the undersides of the chicken piece(s) 123 will get a suitable coating of the breading material 14. Put differently, the underside of the food product 123 is coated mainly by virtue of loading the cells between the panels 40 so full of breading material 14 that the food product 123 actually rests in contact on the breading material 14 rather than on the panel dividers 40 (or for that matter the links of the drag chains 42).

Referring back to FIG. 3a, the chicken product 123 rests on top of the breading material 14 loaded in the open cells of the central conveyor infeed run 341 as it advances in the direction of arrow 121. Virtually a brimming-full load of breading material 14 resides in the open cells of the central conveyor 340 and is being pushed along in the same direction 121 across a support pan (obscured from view). Concurrently, breading material is sifting or sprinkling down on top of the product 123 (as indicated by arrows 141) by means of the sprinkling conveyor 38. The sprinkling conveyor 38 has upper and lower runs 381 and 382, advancing right-to-left and left-to-right respectively. The upper and lower runs 381 and 382 scrape across opposite respective wedge-shaped plates 385 which carry the breading material 141 only so far as the diagonal edge of each plate 385. Given this configuration, the sprinkling conveyor 38 provides substantially a continuous curtain of breading material 141 showering down on the product 123 passing underneath. The speed of the flanking conveyors 344 are separately controllable relative to the central conveyor 341. This allows control over increasing or decreasing the proportionate amount of breading material 141 which is sprinkled by the sprinkling conveyor 38. The entire mixture of product 123 and breading material 14 is advanced for deposit into the intake end 24 of the drum 20 (not shown in FIG. 3a, but indicated by reference numeral 122 in FIG. 2). FIG. 2 also shows that the intake end 24 of the drum 20 has a shield 28 resting against its lower $\frac{1}{3}^{rd}$. This shield 28 helps contain product 12 and breading material 14 from spilling out the intake end 24.

Alternatively, if the coating apparatus 100 is configured in the FIG. 1b format, then the discharge 122 of the central infeed conveyor 340 is deposited on a bypass conveyor 44 extending between the infeed unit and the outflow conveyors.

The coating apparatus 100 includes a drum elevator 45 for hoisting the drum 20 up out of the way to the non-use position shown. The drum elevator 45 comprises a set of four stanchions 46 which support idler pulleys for a cabled reeving system 47. The hoisting by the cables 47 is operated by motor-controlled spools (not shown) as is known in the art. The bypass conveyor 44 is installed under the suspended drum 20 pro tempore of the duration that the coating apparatus 100 is configured in the FIG. 1b (or "drum-bypass") format. Whereas when the food product 12 is pieces or chunks like the chicken pieces 123 illustrated in FIGS. 3a or 3b, it is preferred that food product such as chicken pieces 123 be tumbled in the drum 12 (ie., as by the FIGS. 1a or 2 format of the coating apparatus 100). However, formed products like beef patties are too delicate for tumbling and accordingly it is preferable to bypass the drum 20 as shown in FIG. 1b, and traverse the food product 12 between the infeed unit 102 and outflow conveyors 30–32 by means of the bypass conveyor 44 of FIG. 1b.

In fact, one of the advantageous inventive aspects of this coating apparatus 100 includes that it is convertible between a drum-type configuration as shown in FIG. 1a and a drum-bypass configuration as shown in FIG. 1b.

FIG. 3a shows the food product 123 distributed rather evenly across the central conveyor infeed run 341. FIG. 3b shows that the coating apparatus 100 in accordance with the invention can handle the infeed of the product 12 even if it is supplied in pile(s) 124 as shown. The irregular pile(s) 124 shown by FIG. 3b is representative of how product 12 is supplied to the central conveyor infeed run 341 by a hand-feed operation attended to by one or more workers (not shown). It is an inventive aspect of the coating apparatus 100 that it services a hand-feed of the product 124 as shown by FIG. 3b as well as it handles a relatively evenly distributed incoming stream 123 of product 12 as shown by FIG. 3a. With reference to FIG. 10b, a hand-feed operation is typical of the feed at the pre-dusting station $100^1$ in the process line 110, whereas a relatively more distributed feed of the product 12 is more typical at the breading station $100^2$ thereof.

As FIG. 3b shows, the pile of food product 124 is not likely to be sufficiently coated by the available coating means of the infeed unit 102 alone. Hence it is a desirable aspect of the invention that such piles 124 of food product are tumbled in the drum 20 to ensure more uniform application of the breading material 14 as well as knock off excess.

FIG. 5 is a view of the interior of the infeed unit 102 as taken in the direction of arrows V—V in FIGS. 1a or 2. It shows a vertex of each of the central conveyor 340 and the flanking conveyors 344. FIG. 5 shows not only the infeed run 341 of the central conveyor 340 but also a lower or elevator run 342 of it. Also, this view shows in addition to the upper elevator runs 345 of the flanking conveyors 344, a pair of runs which will be termed the "lower elevator" runs 346 of the flanking conveyors 344. The lower elevator runs 342 and 346 all are shown climbing an incline toward respective idler rollers 49 for each. These lower elevator runs 342 and 346 are loaded with breading material 14, the supply of which will be more particularly described with reference to FIG. 7 (see also FIG. 2).

The elevator run 342 of the central conveyor 340 is loaded with substantially most of the flow of the breading material 14. The lower elevator runs 346 of the flanking conveyors 344 are carrying relatively a fractional amount compared to what the central conveyor 340,342 is carrying. The lower edges 348 of the central conveyor 340's elevator run 342 and the flanking conveyors' lower elevator runs 346 will be termed the "pick-up" edges 348 thereof. The breading material is deposited on the pick up edges 348 as discharged there by the return conveyor 35 of the re-circulation system 18. Actual use shows that the breading material tends to mass together in the center of the return conveyor 35. Hence the deposit on the pick-up edged 348 is undesirably clumped together at the mid-span of the central conveyor 340's pick-up edge 348. To remedy this the infeed unit 102 includes a pair of diverging plows 72 which shove over some fractional amount of breading material 14 from the clump in the middle away to the sides to the lower elevator runs 346 of the flanking conveyors 344.

Even at the idler rollers 49, the breading material 14 is carried in the open-cells of the respective conveyors 340 in a partial circuit around the idler rollers 49. After the direction change around the idler rollers 49, the breading material 14 is carried for further travel, with reference back to FIG. 3a, along the infeed run 341 of the central conveyor 340 as well as the upper elevator runs 345 of the flanking conveyors 344, respectively. Ultimately, the breading material 14 carried in the infeed run 341 and upper elevator runs 345 is deposited in the intake end 24 of the drum 20, as was depicted and described previously with reference to FIG. 3a. In FIG. 5, the pan and troughs which underlie the central conveyor's infeed run 341 and the flanking conveyors' upper elevator runs 345, respectively, have been removed from the view for convenience in the drawings to illustrate the runs 341 and 345. Also, the slot 25 by which the breading material 14 is emptied from the machine 100 (see, eg., FIG. 2), underlies the lower elevator runs 342 and 346, but is hidden from view here in FIG. 5.

FIG. 6 is a vertical section view of the drum 20. Its intake end 24 is the right end in FIG. 6, and its discharge end 22 is the left end. Relative to the vantage point of FIG. 1a, the drum 20 turns clockwise. From the vantage point of FIG. 9, which is an elevational view of the drum discharge end 22, the drum 20 turns counterclockwise. Returning back to FIG. 6, the drum 20 is formed an internal auger 50 attached to the drum sidewall for motivating the mixture of product 12 and breading material 14 in the direction of right to left in FIG. 6 (ie., in the direction from the intake end 24 to the discharge end 22). The drum 20 also has a series of longitudinal flights 52 to successively and lift and drop the mixture of product 12 and breading material 14, and thereby tumble and mix it. At the plane of the discharge end 22, the drum 20 encompasses a counter-rotating spreader impeller 60, which is more clearly shown by FIGS. 8 and 9.

FIG. 7 shows clearly that the discharge flow 125 of the drum 20 empties out onto the series of inclined outflow conveyors 30–32. Each outflow conveyor 30, 31 and 32 has a carrying run 302, 312, and 322, respectively, that carries the product 12 up an incline.

More particularly, the drum 20 drops the discharge flow 125 of the product 12 onto the carrying run 302 of the upper outflow conveyor 30. In turn, the upper outflow conveyor 30 drops the load 125 onto the carrying run 312 of the middle outflow conveyor 31. And in its turn, the middle outflow conveyor 31 drops the load 125 onto the carrying run 322 of the lower outflow carrier 32. At each of these drops, excess breading material 14 is shaken free and allowed to sift down into the return run 324 of the lower conveyor 32. Also, each of these outflow conveyors 30–32 is vibrated to give the food product 125 a bumpy ride which further assists shaking off excess breading material 14. The outflow conveyors 30–32 are vibrated by virtue of having the lower edges of the divider panels (indicated as 40 in FIG. 4) on the carrying runs 301, 312, 322 pass over a line of protruding cams (not shown). As the divider panels (eg., 40 in FIG. 4) pass quickly over the cams (not shown), these induce a wavy vibration in the conveyor(s) 30–32.

The elevation of the drops between the conveyors 30 and 31, or, 31 and 32, measures (very approximately) about four inches (10 cm). This elevation for the drops is more particularly suited to flipping smaller-sized food products such as shrimp or chicken nuggets. However, to double the elevation of the drop, the middle conveyor 31 is removable as indicated in dashed lines in FIG. 7. The doubling of the drop elevation (ie., by removal of the middle conveyor 31) is more particularly suited to flipping larger-sized food products such as chicken strips or fish fillets and the like.

To turn glance ahead at FIG. 8, the carrying runs 302, 312, 322 of the outflow conveyors 30–32 are supported from sagging by coursing over a series of longitudinal ribs 325. These ribs 325 are disposed vertically between the carrying runs 302/312/322 (ie., upper runs) and lower runs of each conveyor 30–32 and extend longitudinally between the opposite rollers which stretch each conveyor 30–32. Trials have found that if these ribs 325 were straight (not shown), their straight edges will carry breading material 14.

That result is unwanted because it is preferred if the breading material 14 drops clear of the ribs 325 for re-circulation back to the infeed unit 102. This situation has been addressed in accordance with the invention by forming the ribs 325 zig-zag as shown. The zig-zag edges fail to carry breading material 14 as straight edges were found to do.

To return to FIG. 7, The lower conveyor 32's return run 324 scrapes along in an appropriate trough for it and hence carries the excess breading material 14 to the lengthy return conveyor 35 that extends underneath the length of the drum 20. Between the drop-off edge of the lower conveyor 32's return run 324 and the return conveyor 35, there is a transverse conveyor 330 that combs the sifting breading material 14 for crumbs of the food product. FIG. 1a shows the shield 331 that surrounds drop-off end of the crumb conveyor 330. The waste crumbs are dropped off here into an appropriate waste bin (not shown). The crumb conveyor 330 generally only combs out crumbs and passes the remainder of the breading material 14 down onto the return conveyor 35.

Experience has taught that the majority of the breading material 14 lands on the return conveyor 35 on its far side (ie., the direction of "far" being relative to the vantage point of FIG. 7). To more evenly distribute the breading material across the width of the return conveyor, a straight plow 334 is disposed at an angle over the lower or carrying run of the return conveyor 35. The angle or obliquity of this plow 334 is illustrated in FIG. 7 in perspective. That is, the plow 334's narrow end is relatively further away from the vantage point of the view as the plow 334's thick end is relatively nearer. Ultimately, the return conveyor 35 deposits its load of excess breading material 14 onto the pick-up edges 348 of the infeed conveyors 340 (i.e., see FIG. 5). In this fashion, the breading material 14 is re-circulated in a loop vis-a-vis the re-circulation system 18 of the coating apparatus 100 in accordance with the invention. The handling of the breading material 14 by the infeed unit 102's lower elevator runs 342 and 346 has been previously shown and described in connection with FIG. 5. The flow of breading material 14 within the re-circulation system 18, as re-circulating in a loop or circuit, has also been previously indicated and described in connection with FIG. 2.

FIG. 7 shows other features of the return conveyor 35, including its partial disassembly for cleaning. The return conveyor 35 as a unit can be dropped down by pivoting it about its left roller (ie., "left" as relative to the vantage point of FIG. 7). This pivoting down of the opposite end 352 is indicated in FIG. 7 by depicting a portion of it in dashed lines. The tray 354 which supports the lower carrying run of the return conveyor is mounted in tracks which allow it to slide out. Dropping the return conveyor 35 as indicated by the position 352 shown in dashed lines, and sliding out the tray 354 (the sliding out of the tray 354 is not illustrated), are convenient for better access to the return conveyor 35 during cleaning as by hosing off breading material and like debris (cleaning is not illustrated).

FIGS. 8 and 9 show the purpose and operation of the spreader impeller 60, which was mentioned previously in connection with FIGS. 6 and 7. FIG. 9 shows that the spreader impeller 60 comprises a hub with three spokes 62 radiating out to terminate in deflector blades 64. The deflector blades 64 carry resilient wipers 63 (eg., neoprene or the like) which wipe the inside wall of the drum. The wipers 63 are flexed forward in the direction that the blades 64 rotate. Whereas FIG. 9 shows that the deflector blades 64 travel in an orbit around the inner periphery of the drum discharge end 22, FIG. 8 shows that each deflector blade 64 is arranged at an angle relative to the longitudinal axis of the drum 20. In FIG. 8, arrow 54 indicates the direction of rotation of the drum 20 whereas arrow 65 indicates the counter-rotation direction of the deflector blade 64.

In FIG. 8, the deflector blade 64 extends between a leading edge 66 and a trailing edge 68. The blade 64 is angled to give the leading edge 66 an angle-of-attack that is shown generally by FIG. 8, to bite into the flow of product pieces 126 and scrape them off the terminal end of the cam-surface side 56 of the auger 50. As the blade 64 continues wiping across the bottom of the drum 20 (right to left as shown in FIG. 8) the product pieces 126 slide along the blade 64 to trail off the trailing edge 68 as shown and drop onto the outflow conveyor 30–32. In doing so, the deflector blade 64 lays down a course 127 of product pieces 126 on the outflow conveyors 30–32 which carries the product pieces 126 in the direction of arrows 128. Whereas the drawings show that the product pieces 126 land on the outflow conveyor 30–32 in a series of diagonal courses 127, in actual trials the diagonal trending of the product pieces 126 is difficult to discern. But given the ideal representation of FIG. 8, each diagonal course 127 represents one swipe of a deflector blade 64. Also, the outflow conveyors 30–32 are flanked by low, left and right fences 69 to contain the product on the outflow conveyors 30–32.

At present it is preferred if the drum 20 and the counter-rotating distribution impeller 60 are driven by separate a motors (the drum motor and transmission are indicated as 70 in FIG. 2, the spreader motor is hidden from directly behind the drum motor). Whereas the present embodiment of the invention encompasses two motors for driving the drum 20 and impeller 60, the inventors hereof do not exclude the possibility of driving the drum 20 and spreader impeller 60 by other means including by a single motor. The speeds of the drum 20 and the spreader 60 are easily separately controllable, and hence this allows using trial and error adjust to the preferred speed ratio between the drum 20 and spreader impeller 60. However, trials have shown that with the three spoke configuration of the spreader 60 as shown, a preferred speed ratio between the drum 20 and spreader 60 is about 3:1 (i.e., three drum revolutions pursuant to one impeller revolution). Given the foregoing arrangement of the spreader impeller 60 and drum auger 50, the coating apparatus 100 in accordance with invention desirably spreads the discharge flow 125 or 127 of product 12 from the drum 20 rather evenly across the width of the outflow conveyor 30–31, as shown.

FIGS. 10a and 10b depict various advantages of the coating apparatus 100 in accordance with the invention in comparison to the in-line and drum breading machines 212 and 214 of the prior art. FIGS. 10a and 10b are pair of diagrammatic views which show for comparison how a food processing line is configured in accordance with the prior art (eg., 210 in FIG. 10a) and the invention (eg., 110 in FIG. 10b) to step through the three operations of (i) pre-dusting a food product with a flour mixture, (ii) coating the pre-dusted product with a batter mixture, and then (ii) coating the batter-covered product with a breading mixture.

In FIG. 10a, the prior art food process line 210 comprises, in series, a "pre-dusting" station $214^1$, a first "crew" station 216, a "batter" station 218," the in-line "breading" station 212, a "tumbling" station $214^2$, and a second "crew" station 222. The pre-dusting functions at the pre-dusting station $214^1$ are performed by a prior art drum machine 214. It discharges onto a conveyor which forms the first "crew" station 216. The first "crew" station 216 is staffed by a crew of between about four to six workers who manually separate the clumped-together discharge of the "pre-duster" drum machine $214^1$, and spread the product 12 out across the conveyor in suitable form for feeding to the batter station 218. To date these workers are continually busy when at work on a prior art process line 210 as depicted here. The batter station 218 outputs to a prior art in-line breader 212, which outputs to a second prior art drum machine $214^2$ that tumbles off the excess breading. This second prior art drum machine $214^2$ discharges onto a conveyor that forms the second "crew" station 222. The second "crew" station 222, like the first 216, is staffed by between about four to six workers who separate the clumped-together discharge of the "tumbling" station drum machine $214^2$, and spread the product out across the conveyor in suitable form for feeding to a fryer (not shown).

FIG. 10b shows how the same work is accomplished by using a pair of the coating apparatus $100^1$ and $100^2$ in accordance with the invention. The FIG. 10b food process line 110 comprises, in series, a "pre-dusting" station $100^1$, an "inspection" station 115, a "batter" station" 218, and a "breading" station $100^2$. The pre-dusting functions at the pre-dusting station are performed by the first coating apparatus $100^1$ used in this line 110. It discharges onto a conveyor which forms the "inspection" station 115. The "inspection" station is staffed by one worker who provides quality control assurance that the discharge of the pre-dusting station $100^1$ is spread suitably across the conveyor at the inspection station 115 for feeding to the batter station 218. It is presumed that most of the time the staff worker will be idle. In fact, his or her duties will more likely entail adjusting the speed ratio(s) of the spreader and drum as well as attending to re-charging the flour mixture, rather than spreading apart clumped together food product. When the coating apparatus $100^1$ at the flour station discharges clumped together food product, this signals more a need for a machine adjustment than a need for returning to the old ways of a crew spreading apart the product. The batter station 218 outputs to another coating apparatus $100^2$ in accordance with the invention, which combines breading and tumbling operations into one machine, and obviates the second "crew" station 222 of the prior art line 210.

Given the foregoing, a pair of coating apparatus $100^1$ and $100^2$ in accordance with the invention condense into three stations $100^1$, 115, and $100^2$ what before in the prior art has been transacted by five stations $214^1$, 216, 212, $214^2$, and 222. The staffing requirements has been reduced from between about eight or dozen workers, to just one.

Another advantage involves times when the line 110 is switched between running one kind of food product to a second, where the second food product is a formed product (eg., beef patties). Previously, this required (after cleaning) breaking apart the prior art line 210 and stripping out the prior art drum machines $214^1$ and $214^2$. In accordance with the invention, the coating apparatus $100^1$ and $100^2$ in accordance are left in place and merely converted from the FIG. 1a format (described above) to the FIG. 1b "bypass" format. The re-conversion back to the FIG. 1a format is equally as simple and efficient.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. In combination, a convertible drum-type coating apparatus and a removable bypass conveyor for applying a coating material to a food product, comprising:

a bypass conveyor; and, the convertible drum-type coating apparatus, which comprises an infeed section, a rotary drum, drum-transporting means for supporting the drum and transporting the drum between a use position and a non-use position, and, stand means for supporting the infeed section and drum-transporting means;

wherein the infeed section includes a carrying conveyor extending between an intake end for receiving an inflow of product and a discharge end for discharging the product, the infeed section also including an overhead sifting means for sifting coating material down on the flow of product on the carrying conveyor;

wherein the rotary drum extends between an intake end and a discharge end and is mounted on the drum-transporting means such that in the use position, the product discharged by the infeed section's discharge end is deposited in the drum's intake end;

wherein the stand means includes installation means for installation of the bypass conveyor in the place of the drum after the drum has been transported out of the way to the non-use position, such that the installation of the bypass conveyor allows product discharged by the infeed section's discharge end to be deposited on the bypass conveyor; and, said combination including drive means for driving the drum and conveyors.

2. The combination of claim 1 wherein the drum-transporting means comprises an elevator for lowering and lifting the drum between a low use position and a high non-use position.

3. The combination of claim 2 wherein the elevator comprises a set of stanchions and a cabled reeving system for hoisting the drum up from the low use position to the high non-use position.

4. The combination of claim 1 wherein the carrying conveyor comprises a drag chain conveyor having open cells which allows pre-loading of breading material in the open cells before receipt of the inflow of product.

5. The combination of claim 1 wherein the bypass conveyor comprises a drag chain conveyor.

6. The combination of claim 1 wherein the overhead sifting means comprises a transverse-mounted drag chain conveyor.

7. In combination, an in-line breading section and a drum-type tumbling section for applying a breading material coating to a food product, said combination comprising:

an in-line breading section;

a drum-type tumbling section;

stand means for supporting the combination in-line breading section and drum-type tumbling section;

wherein the in-line breading section includes a carrying conveyor extending between an intake end for receiving an inflow of product and a discharge end for discharging the product, the in-line breading section also including an overhead sifting means for sifting coating material down on the flow of product on the carrying conveyor;

wherein the drum-type tumbling section includes a rotary drum that extends between an intake end and a discharge end and is mounted on the stand means such that the product discharged by the in-line breading section's discharge end is deposited in the drum's intake end; and, said combination including drive means for driving the drum and conveyor.

8. The combination of claim 7 wherein the stand means comprises carts mounted on casters.

9. The combination of claim 8 further comprising an outflow section having an outflow conveyor extending between an intake end and a discharge end, the outflow section being mounted on the stand means such that the product discharged by the drum's discharge end is deposited on the outflow conveyor's intake end.

10. The combination of claim 9 further comprising an auger-less re-circulation system for re-circulating excess breading material recovered at the outflow section for return to the in-line breading section;

wherein the outflow conveyor comprises an open-cell drag conveyor which transports the product while allowing excess breading material to sift through; and, wherein the recirculation system comprises at least one drag chain return conveyor extending from an origin beneath the excess breading sifting through the outflow conveyor, to a termination at the in-line breading section.

11. The combination of claim 10 wherein the return conveyor is mounted to the stand means such that it traverses underneath the drum.

12. The combination of claim 11 wherein the return conveyor is mounted to the stand means such that one end is releasably coupled in a use position and the opposite end is mounted on a pivot connection which allows the return conveyor to pivot down about the pivot connection into a non-use, service-and-cleaning position.

13. The combination of claim 10 wherein the in-line breading section comprises at least one elevator conveyor for carrying breading material returned by the return conveyor to supply the overhead sifting means.

14. The combination of claim 13 wherein the in-line breading section's carrying conveyor comprises a drag chain conveyor having open cells which allow pre-loading of breading material in the open cells before receipt of the inflow of product; and, wherein the in-line breading section further includes elevator means for carrying breading material returned by the return conveyor to supply the carrying conveyor.

15. The combination of claim 8 wherein the overhead sifting means comprises a transverse-mounted drag chain conveyor.

16. A combination drum-type coating apparatus for applying a breading material coating to a food product, comprising:

an infeed section;

a rotary drum;

an outflow section; and stand means for supporting the infeed section, the drum and the outflow section;

wherein the infeed section includes an infeed conveyor extending between an intake end for receiving an inflow of product and a discharge end for discharging the product;

wherein the drum extends between an intake end and a discharge end and is mounted on the stand means such that the product discharged by the infeed conveyor's discharge end is deposited in the drum's intake end;

wherein the outflow section includes an outflow conveyor extending between an intake end and a discharge end, the outflow section being mounted on the stand means such that the product discharged by the drum's discharge end is deposited on the outflow conveyor's intake end;

said combination including drive means for driving the drum and conveyors; and, said combination including spreader means coupled with the drum's discharge end for spreading the discharging product in a series of courses traversing the lateral width of the outflow conveyor.

17. The combination of claim 16 wherein the spreader means comprises at least one wiper blade mounted for rotation within the drum's discharge end and driven by the drive means to rotate in opposite direction of the rotary drum, the wiper blade being disposed in one of contact with or closely adjacent to an inside perimeter of the drum's discharge end.

18. The combination of claim 17 wherein the spreader means comprises "n" evenly-spaced counter-rotating blades and the drive means drives the counter-rotating blades at an "n:1" speed ratio to the rotary drum such that the courses of product on the outflow conveyor trend diagonally across the width of the outflow conveyor and each course corresponds to one swipe of a blade.

19. The combination of claim 18 wherein the drum has an internal auger attached to its inside sidewall, which auger has one side acting as a cam surface for motivating the mixture of product and breading material in the direction of the discharge end, and which also has a termination that is spaced by a gap from the plane of the drum's discharge end;

wherein the blades rotate occupying a ring portion within the discharge end of the drum that corresponds in measure to the size of said gap.

20. The combination of claim 16 wherein the drive means comprises one or more hydraulic motors.

* * * * *